US010678973B2

(12) United States Patent
Chuang et al.

(10) Patent No.: US 10,678,973 B2
(45) Date of Patent: Jun. 9, 2020

(54) MACHINE-LEARNING DESIGN ENABLEMENT PLATFORM

(71) Applicant: Taiwan Semiconductor Manufacturing Co., Ltd., Hsinchu (TW)

(72) Inventors: Yi-Lin Chuang, Taipei (TW); Ching-Fang Chen, Taichung (TW); Wei-Li Chen, Zhubei (TW); Wei-Pin Changchien, Taichung (TW); Yung-Chin Hou, Taipei (TW); Yun-Han Lee, Hsinchu County (TW)

(73) Assignee: Taiwan Semiconductor Manufacturing Co., Ltd. (TW)

( * ) Notice: Subject to any disclaimer, the term of this patent is extended or adjusted under 35 U.S.C. 154(b) by 149 days.

(21) Appl. No.: 15/724,663

(22) Filed: Oct. 4, 2017

(65) Prior Publication Data
US 2018/0268096 A1   Sep. 20, 2018

Related U.S. Application Data

(60) Provisional application No. 62/471,538, filed on Mar. 15, 2017.

(51) Int. Cl.
*G06F 17/50* (2006.01)
*G06N 20/00* (2019.01)
(Continued)

(52) U.S. Cl.
CPC .............. *G06F 30/27* (2020.01); *G06F 30/30* (2020.01); *G06F 30/337* (2020.01);
(Continued)

(58) Field of Classification Search
None
See application file for complete search history.

(56) References Cited

U.S. PATENT DOCUMENTS 6,314,390 B1 * 11/2001 Bittner ................ G06F 17/5036
703/14
7,103,524 B1 * 9/2006 Teig .................... G06F 17/5081
703/14
(Continued)

OTHER PUBLICATIONS

X.Q. Li et al., "Machine Learning-Based VLSI Cells Shape Function Estimation," IEEE Trans on Computer-Aided Design of Integrated circuits and Systems, vol. 17, No. 7, Jul. 1998, pp. 613-623. (Year: 1998).*
(Continued)

*Primary Examiner* — Leigh M Garbowski
(74) *Attorney, Agent, or Firm* — Sterne, Kesssler, Goldstein & Fox P.L.L.C.

(57) ABSTRACT

Electronic design automation (EDA) of the present disclosure, in various embodiments, optimizes designing, simulating, analyzing, and verifying of one or more electronic architectural designs for an electronic device. The EDA of the present disclosure identifies one or more electronic architectural features from the one or more electronic architectural designs. In some situations, the EDA of the present disclosure can manipulate one or more electronic architectural models over multiple iterations using a machine learning process until one or more electronic architectural models from among the one or more electronic architectural models satisfy one or more electronic design targets. The EDA of the present disclosure substitutes the one or more electronic architectural models that satisfy the one or more electronic design targets for the one or more electronic architectural features in the one or more electronic architectural designs to optimize the one or more electronic architectural designs. The EDA of the present disclosure can substitute the one or more electronic architectural models before, during, and/or after designing, simulating, analyzing, and/or verifying of the one or more electronic architectural designs to effectively decrease the time to market (TTM) for the electronic device.

20 Claims, 8 Drawing Sheets

(51) Int. Cl.

| | |
|---|---|
| *H01L 27/00* | (2006.01) |
| *G06F 30/27* | (2020.01) |
| *G06F 30/30* | (2020.01) |
| *G06F 30/3308* | (2020.01) |
| *G06F 30/337* | (2020.01) |
| *G06F 30/373* | (2020.01) |
| *H01L 27/02* | (2006.01) |
| *H05K 3/00* | (2006.01) |
| *G06F 30/392* | (2020.01) |
| *G06F 30/394* | (2020.01) |
| *G06F 30/398* | (2020.01) |
| *H01L 27/118* | (2006.01) |
| *G06F 30/367* | (2020.01) |
| *G06F 111/06* | (2020.01) |
| *G06F 111/02* | (2020.01) |
| *G06F 119/22* | (2020.01) |

(52) U.S. Cl.
CPC ........ *G06F 30/3308* (2020.01); *G06F 30/373* (2020.01); *G06N 20/00* (2019.01); *G06F 30/367* (2020.01); *G06F 30/392* (2020.01); *G06F 30/394* (2020.01); *G06F 30/398* (2020.01); *G06F 2111/02* (2020.01); *G06F 2111/06* (2020.01); *G06F 2119/22* (2020.01); *H01L 27/0203* (2013.01); *H01L 27/0207* (2013.01); *H01L 2027/11859* (2013.01); *H01L 2027/11864* (2013.01); *H05K 3/00* (2013.01)

(56) References Cited

U.S. PATENT DOCUMENTS

| | | | | |
|---|---|---|---|---|
| 7,673,278 B2* | 3/2010 | Rathsack | ................ | H01L 22/20 716/56 |
| 7,707,533 B2* | 4/2010 | McConaghy | ....... | G06F 17/5036 703/14 |
| 8,117,568 B2* | 2/2012 | Xiang | ................ | G06F 17/5009 703/14 |
| 8,548,777 B2* | 10/2013 | Sturrock | ................ | G06N 20/00 703/6 |
| 8,751,273 B2* | 6/2014 | Pinto | ....................... | G06F 17/50 705/7.11 |
| 8,887,134 B2* | 11/2014 | Weatherhead | .......... | G06F 17/50 717/107 |
| 9,021,409 B2* | 4/2015 | Vasudevan | ............ | G06F 17/504 716/106 |
| 9,690,898 B2* | 6/2017 | Graur | .................. | G06F 17/5081 |
| 10,102,320 B2* | 10/2018 | Pataky | ................ | G06F 17/5022 |
| 10,254,641 B2* | 4/2019 | Mailfert | ................... | G03F 1/36 |
| 2003/0237064 A1 | 12/2003 | White et al. | | |
| 2008/0127000 A1 | 5/2008 | Majumder et al. | | |
| 2009/0013292 A1 | 1/2009 | Brunet | | |
| 2009/0070716 A1* | 3/2009 | Joshi | .................... | G06F 17/5081 716/132 |
| 2009/0249259 A1 | 10/2009 | Penzes et al. | | |
| 2016/0117436 A1* | 4/2016 | Ng | ..................... | G06F 17/5045 716/113 |
| 2016/0253445 A1 | 9/2016 | Pataky | | |

OTHER PUBLICATIONS

S. Fenstermaker et al., "METRICS: A System Architecture for Design Process Optimization," ACM/DAC 2000, pp. 705-710. (Year: 2000).*

M. Barros et al. "GA-SVM Feasibility Model and Optimization Kernel Applied to Analog IC Design Automation," GLSVLSI'07, ACM 2007, pp. 469-472. (Year: 2007).*

L.-C. Wang et al., "Data Mining in EDA—Basic Principles, Promises, and Constraints," ACM/DAC 2014, 6 pages. (Year: 2014).*

B. Li et al., "Machine Learning in Physical Design," 2016 IEEE, pp. 147-150. (Year: 2016).*

M. M. Ziegler et al., "A Synthesis-Parameter Tuning System for Autonomous Design-Space Exploration," 2016 Design, Automation & Test in Europe Conference & Exhibition (DATE), pp. 1148-1151. (Year: 2016).*

L. Capodieci, "Data Analytics and Machine Learning for Design-Process-Yield Optimization in Electronic Design Automation and IC Semiconductor Manufacturing," 2017 China Semiconductor Technology International Conference, 3 pages. (Year: 2017).*

Martins, Ricardo, et al. AIDA: Automated analog IC design flow from circuit level to layout. 2012 International Conference on Synthesis, Modeling, Analysis and Simulation Methods and Aplications to Circuit Design (SMACD). IEEE. 2012.

* cited by examiner

MACHINE-LEARNING DESIGN ENABLEMENT PLATFORM

CROSS-REFERENCE TO RELATED APPLICATIONS

The present application claims the benefit of U.S. Provisional Patent Appl. No. 62/471,538, filed Mar. 15, 2017, which is incorporated herein by reference in its entirety.

BACKGROUND

Advances in technology and engineering have allowed designers and manufacturers to offer more electronic devices to consumers. Often times, the designers and/or the manufacturers utilize electronic design automation (EDA), also referred to as electronic computer-aided design (ECAD), throughout the design of an electronic device. EDA represents as a category of software tools available to designers and manufacturers for designing the electronic device. Many software tools are available to the designers and/or the manufacturers to design, to simulate, to analyze, and to verify the electronic device before fabrication onto an integrated circuit (IC) or semiconductor substrate. Conventional software tools used to design the electronic device utilize a high-level software language at a register-transfer level (RTL) to develop a software implementation of analog and/or digital circuitry for the electronic device. Conventional software tools used to simulate the electronic device utilize conventional simulation algorithms to replicate behavior of one or more electronic architectural features of the software implementation. Conventional software tools used to analyze the electronic device evaluate the one or more electronic architectural features of the electronic device. Conventional software tools are also used to verify the one or more electronic architectural features of the software implementation satisfy requirements for the one or more electronic architectural features as outlined in an electronic design specification.

These conventional software tools need to complete their designing, their simulating, their analyzing, and their verifying of the electronic device before the electronic device can be optimized. For example, the conventional software tools to design the electronic device complete placement and/or routing of standard library cells from among a predefined library of standard cells, which form the electronic device, before the placement and/or the routing of the standard library cells can be optimized through a trial, and error process. In this example, the designers and/or the manufacturers manually adjust the placement and/or the routing of the standard library cells over many iterations to optimize the placement and/or the routing of the standard library cells. This trial and error process unnecessarily increases the time to market (TTM) for the electronic device often requiring the designers and/or the manufacturers to unnecessarily duplicate many aspects of the designing, the simulating, the analyzing, and the verifying for the electronic device over many iterations until the one or more electronic architectural features of the electronic device satisfy the requirements for the one or more electronic architectural features as outlined in the electronic design specification.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
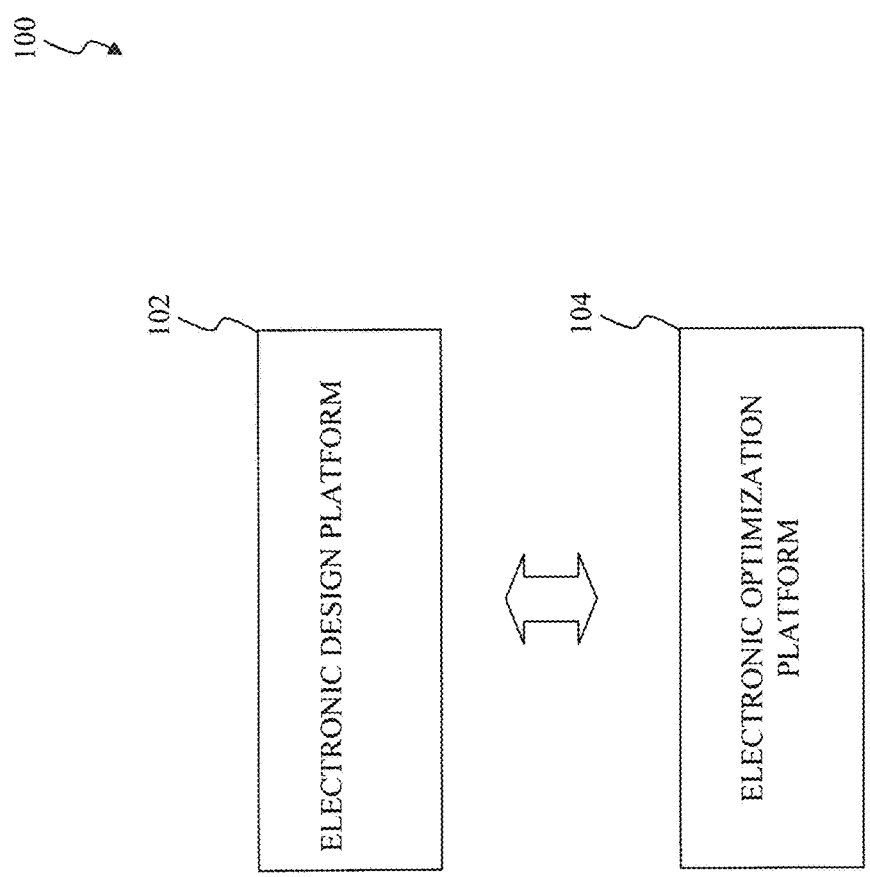
FIG. 1 illustrates a block diagram of an exemplary design platform for an electronic device according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

Overview

Electronic design automation (EDA) of the present disclosure, in various embodiments, optimizes designing, simulating, analyzing, and verifying of one or more electronic architectural designs for an electronic device. The one or more electronic architectural designs can represent one or more images and/or one or more data-based representations of geometric shapes describing circuitry of the electronic device, locations of the geometric shapes, and/or interconnections between the geometric shapes. The EDA of the present disclosure identifies one or more electronic architectural features, such as the geometric shapes, the locations of the geometric shapes, and/or the interconnections between the geometric shapes to provide some examples, from the one or more electronic architectural designs. In some situations, the EDA of the present disclosure can utilize a machine learning process to manipulate the one or more electronic architectural features, for example, adjust the geometric shapes, adjust the locations of the geometric shapes, and/or adjust the interconnections between the geometric shapes of the one or more electronic architectural models, over multiple iterations to develop one or more electronic architectural models until the or more electronic architectural models satisfy one or more electronic design targets. The EDA of the present disclosure substitutes the one or more electronic architectural models that satisfy the one or more electronic design targets for the one or more electronic architectural features in the one or more electronic architectural designs to optimize the one or more electronic architectural designs. The EDA of the present disclosure can substitute the one or more electronic architectural models before, during, and/or after designing, simulating, analyzing, and/or verifying of the one or more electronic architectural designs to effectively decrease the time to market (TTM) for the electronic device.

Exemplary Design Environment for the Electronic Device

FIG. 1 illustrates a block diagram of an exemplary design platform for an electronic device according to an exemplary embodiment of the present disclosure. An electronic design environment 100 can optimize one or more electronic architectural designs for an electrical device before, during, and/or after designing, simulating, analyzing, and/or verifying of the one or more electronic architectural designs. As illustrated in FIG. 1, the electronic design environment 100 includes an electronic design platform 102 and an electronic optimization platform 104. In an exemplary embodiment, the electronic design platform 102 and/or the electronic optimization platform 104 can be implemented in hardware, firmware, software, or any combination thereof. Further, firmware, software, routines, instructions, and/or applications can be described herein as performing certain actions. However, it should be appreciated that such descriptions are merely for convenience and that such actions in fact result from computing devices, processors, controllers, or other devices executing the firmware, software, routines, instructions, and/or applications. As another example, the electronic design platform 102 and/or the electronic optimization platform 104 can be implemented as instructions stored on a machine-readable medium, which may be read and executed by one or more processors. Herein, a machine-readable medium may include any mechanism for storing or transmitting information in a form readable by one or more computing devices, processors, controllers, or other devices that will be apparent to those skilled in the relevant art(s) without departing from the spirit and scope of the present disclosure. A machine-readable medium can include a read only memory (ROM), a random access memory (RAM), a magnetic disk storage medium, a solid state storage medium, an optical storage media, and/or a flash memory device to provide some examples.

The electronic design platform 102 represents a design flow including one or more electronic design software tools, that when executed by one or more computing devices, processors, controllers, or other devices that will be apparent to those skilled in the relevant art(s) without departing from the spirit and scope of the present disclosure, can design, simulate, analyze, and/or verify the one or more electronic architectural designs. In an exemplary embodiment, the electronic design platform 102 can be situated along with the electronic optimization platform 104 in a centralized location. In another exemplary embodiment, the electronic design platform 102 can be remotely situated from the electronic optimization platform 104. In these exemplary embodiments, a subscription based service and/or license can be provided to access the electronic optimization platform 104. For example, the subscription based service and/or license can be provided to access the electronic optimization platform 104 to optimize the designing, the simulating, the analyzing, and the verifying of the one or more electronic architectural designs by the electronic design platform 102. An exemplary embodiment for the electronic design platform 102 is to be further described in detail in FIG. 2. This exemplary embodiment further describes various aspects of the electronic design platform 102.

The electronic optimization platform 104 includes one or more design optimization software tools, that when executed by one or more computing devices, processors, controllers, or other devices that will be apparent to those skilled in the relevant art(s) without departing from the spirit and scope of the present disclosure, can optimize the designing, the simulating, the analyzing, and the verifying of the one or more electronic architectural designs provided by the electronic design platform 102. The electronic optimization platform 104 identifies one or more electronic architectural features, such as geometric shapes, locations of the geometric shapes, and/or interconnections between the geometric shapes to provide some examples, from the one or more electronic architectural designs. In some situations, the electronic optimization platform 104 can manipulate one or more electronic architectural features, for example, adjust the geometric shapes, adjust the locations of the geometric shapes, and/or adjust the interconnections between the geometric shapes over multiple iterations to develop one or more electronic architectural models using a machine learning process until the one or more electronic architectural models satisfy one or more electronic design targets. The machine learning process is to be described in further detail below. The electronic optimization platform 104 substitutes the one or more electronic architectural models that satisfy the one or more electronic design targets for the one or more electronic architectural features in the one or more electronic architectural designs to optimize the one or more electronic architectural designs. The electronic optimization platform 104 can substitute the one or more electronic architectural models before, during, and/or after designing, simulating, analyzing, and/or verifying of the one or more electronic architectural designs by the electronic design platform 102 to effectively decrease the time to market (TTM) for the electronic device.

Exemplary Electronic Design Platform of the Exemplary Design Environment

Figure 2:
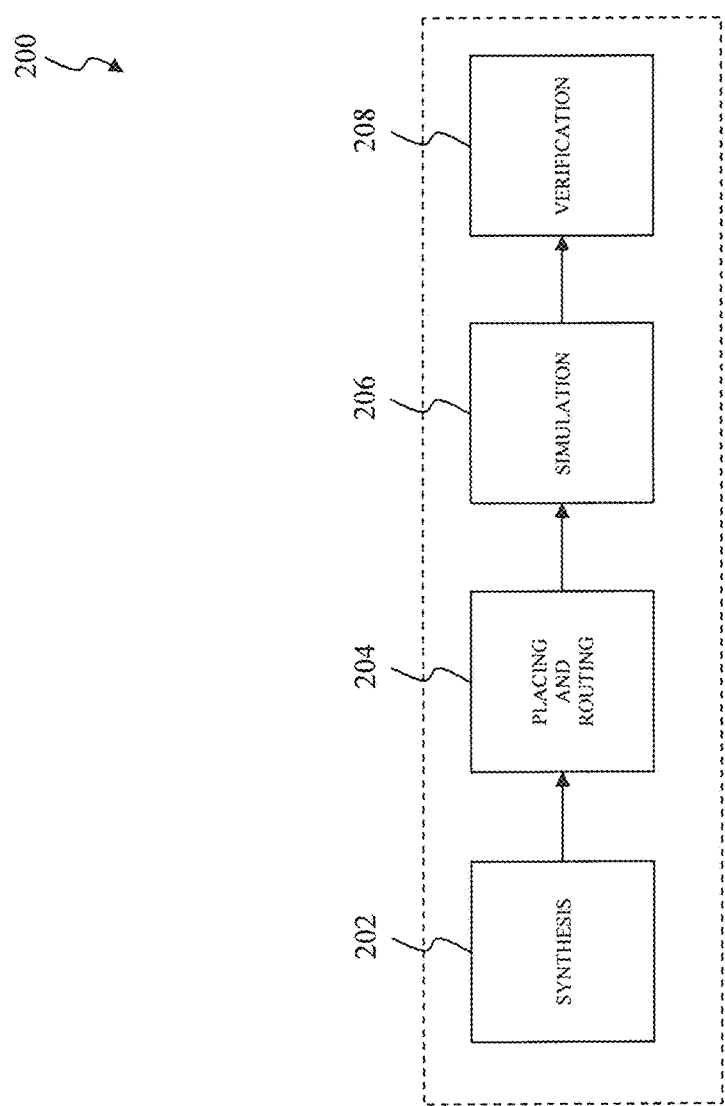
FIG. 2 illustrates a block diagram of an electronic design platform of the exemplary design environment according to an exemplary embodiment of the present disclosure.

FIG. 2 illustrates a block diagram of an electronic design platform of the exemplary design environment according to an exemplary embodiment of the present disclosure. As illustrated in FIG. 2, the electronic design platform 200 represents a design flow including one or more electronic design software tools, that when executed by one or more computing devices, processors, controllers, or other devices that will be apparent to those skilled in the relevant art(s) without departing from the spirit and scope of the present disclosure, can design, simulate, analyze, and/or verify one or more high-level software level descriptions of analog and/or digital circuitry for an electronic device. In an exemplary embodiment, the one or more high-level software level descriptions can be implemented using a high-level software language, such as a graphical design tool, for example C, System C, C++, LabVIEW, and/or MATLAB, a general purpose system design language, such as like SysML, SMDL and/or SSDL, or any other suitable high-level software language or the high-level software format that will be apparent to those skilled in the relevant art(s) without departing from the spirit and scope of the present disclosure, or a high-level software format, such as Common Power Format (CPF), Unified Power Formant (UPF), or any other suitable high-level software format that will be apparent to those skilled in the relevant art(s) without departing from the spirit and scope of the present disclosure. In the exemplary embodiment illustrated in FIG. 2, the electronic design platform 200 includes a synthesis tool 202, a layout tool 204, a simulation tool 206, and a verification tool 208. The electronic design platform 200 can represent an exemplary embodiment of the electronic design platform 102 as described above in FIG. 1.

The synthesis tool 202 represents an electronic design software tool, which when executed by one or more computing devices, processors, controllers, or other devices that will be apparent to those skilled in the relevant art(s) without departing from the spirit and scope of the present disclosure, translates one or more characteristics, parameters, or attributes of the electronic device into one or more logic operations, one or more arithmetic operations, one or more control operations, and/or any other suitable operation that will be apparent to those skilled in the relevant art(s) without departing from the spirit and scope of the present disclosure into the one or more high-level software level descriptions in terms of the analog circuitry and/or the digital circuitry. The synthesis tool 202 can utilize a simulation algorithm to simulate the one or more logic operations, one or more arithmetic operations, one or more control operations, and/or the other suitable operation to verify the one or more logic operations, one or more arithmetic operations, one or more control operations, and/or the other suitable operation perform in accordance with one or more characteristics, parameters, or attributes of the electronic device as outlined in an electronic design specification.

The layout tool 204 represents an electronic design software tool, which when executed by one or more computing devices, processors, controllers, or other devices that will be apparent to those skilled in the relevant art(s) without departing from the spirit and scope of the present disclosure, defines the one or more logic operations, one or more arithmetic operations, one or more control operations, and/or the other suitable operation from the synthesis tool 202 in terms of geometric shapes which correspond to diffusion layers, polysilicon layers, metal layers, and/or interconnections between layers. In an exemplary embodiment, the layout tool 204 can provide one or more high-level software level descriptions of the geometric shapes, the locations of the geometric shapes, and/or the interconnections between the geometric shapes to an electronic optimization platform, such as the electronic optimization platform 104 or an electronic optimization platform 300 as to be described in FIG. 3 below, to optimize the geometric shapes, the locations of the geometric shapes, and/or the interconnections between the geometric shapes as will be described in further detail below. In another exemplary embodiment, the geometric shapes for some of the analog circuitry and/or the digital circuitry can be defined in accordance with a standard cell from among a predefined library of standard cells associated with a technology library. The standard cell represents one or more semiconductor devices as well as their interconnection structures that are configured and arranged to provide a logical function, such as AND, OR, XOR, XNOR, or NOT to provide some examples, or a storage function, such as a flipflop or a latch to provide some examples. Although the simplest standard cells are direct representations of the elemental NAND, NOR, XOR, or NOT Boolean logic functions, those skilled in the relevant art(s) will recognize that standard cells of much greater complexity are possible without departing from the spirit and scope of the present disclosure. The predefined library of standard cells is defined in terms of geometric shapes which correspond to diffusion layers, polysilicon layers, metal layers, and/or interconnections between layers. Thereafter, the layout tool 204 assigns locations for the geometric shapes and/or interconnections between the geometric shapes on a printed circuit board (PCB) and/or a semiconductor substrate. In an exemplary embodiment, the layout tool 204 utilizes a textual or an image-based netlist describing the analog circuitry, the digital circuitry, the technology library, a semiconductor foundry for fabricating the electronic device and/or a semiconductor technology node for fabricating the electronic device to assign the geometric shapes, the locations of the geometric shapes, and/or the interconnections between the geometric shapes.

The simulation tool 206 represents an electronic design software tool, which when executed by one or more computing devices, processors, controllers, or other devices that will be apparent to those skilled in the relevant art(s) without departing from the spirit and scope of the present disclosure, simulates the geometric shapes, the locations of the geometric shapes, and/or the interconnections between the geometric shapes to replicate one or more characteristics, parameters, or attributes of the geometric shapes, the locations of the geometric shapes, and/or the interconnections between the geometric shapes. In an exemplary embodiment, the simulation tool 206 can provide one or more high-level software level descriptions of the geometric shapes, the locations of the geometric shapes, and/or the interconnections between the geometric shapes to an electronic optimization platform, such as the electronic optimization platform 104 or an electronic optimization platform 300 as to be described in FIG. 3 below, before, during, and/or after their simulation to optimize the geometric shapes, the locations of the geometric shapes, and/or the interconnections between the geometric shapes as will be described in further detail below. In another exemplary embodiment, the simulation tool 206 can provide a static timing analysis (STA), a voltage drop analysis, also referred to an IREM analysis, a Clock Domain Crossing Verification (CDC check), a formal verification, also referred to as model checking, equivalence checking, or any other suitable analysis that will be apparent to those skilled in the relevant art(s) without departing from the spirit and scope of the present disclosure. In a further exemplary embodiment, the simulation tool 206 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the other suitable analysis.

The verification tool 208 represents an electronic design software tool, which when executed by one or more computing devices, processors, controllers, or other devices that will be apparent to those skilled in the relevant art(s) without departing from the spirit and scope of the present disclosure, verifies the one or more characteristics, parameters, or attributes of the geometric shapes, the locations of the geometric shapes, and/or the interconnections between the geometric shapes as replicated by the simulation tool 206 satisfy the electronic design specification. In an exemplary embodiment, the verification tool 208 can provide one or more high-level software level descriptions of the geometric shapes, the locations of the geometric shapes, and/or the interconnections between the geometric shapes to an electronic optimization platform, such as the electronic optimization platform 104 or an electronic optimization platform 300 as to be described in FIG. 3 below, before, during, and/or after their verification to optimize the geometric shapes, the locations of the geometric shapes, and/or the interconnections between the geometric shapes as will be described in further detail below. The verification tool 208 can also perform a physical verification, also referred to as a design rule check (DRC), to check whether the geometric shapes, the locations of the geometric shapes, and/or the interconnections between the geometric shapes assigned by the layout tool 204 satisfies a series of recommended parameters, referred to as design rules, as defined by a semiconductor foundry and/or semiconductor technology node for fabricating the electronic device.

Exemplary Optimization Platform of the Exemplary Design Environment

Figure 3:
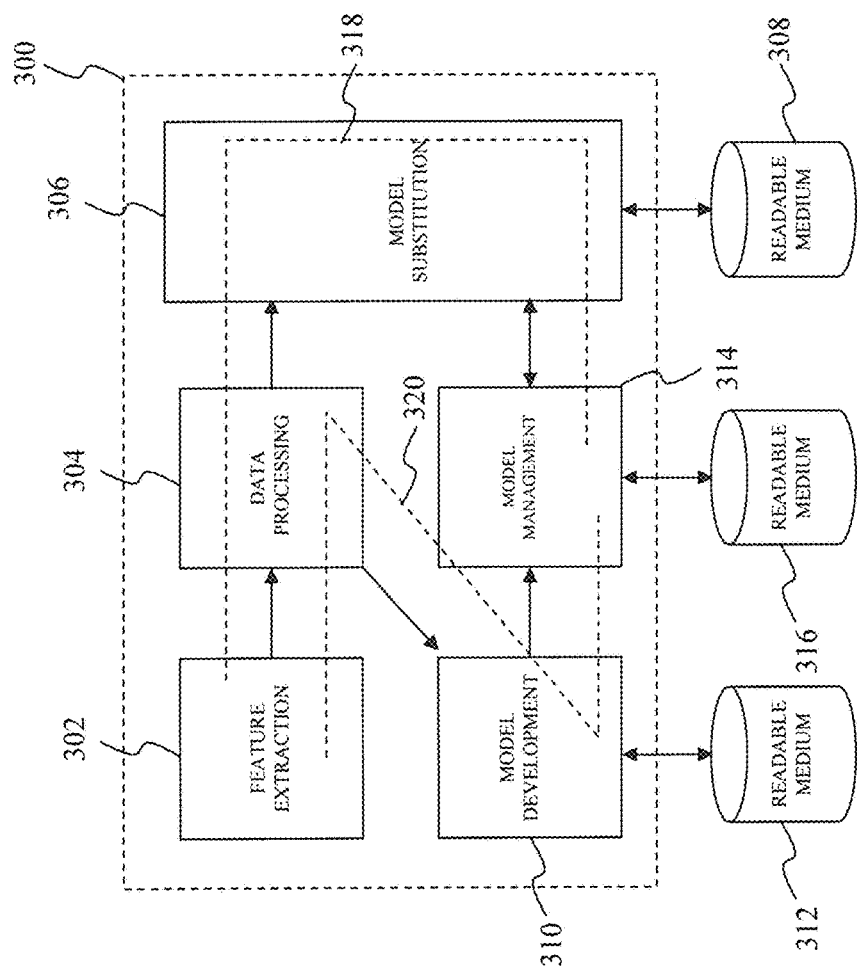
FIG. 3 illustrates a block diagram of an electronic optimization platform of the exemplary design environment according to an exemplary embodiment of the present disclosure.

FIG. 3 illustrates a block diagram of an electronic optimization platform of the exemplary design environment according to an exemplary embodiment of the present disclosure. As illustrated in FIG. 3, the electronic optimization platform 300 represents one or more machine design optimization tools, that when executed by one or more computing devices, processors, controllers, or other devices that will be apparent to those skilled in the relevant art(s) without departing from the spirit and scope of the present disclosure, can optimize the designing, the simulating, the analyzing, and the verifying of one or more high-level software level descriptions of an electronic device. In an exemplary embodiment, the one or more high-level software level descriptions can be provided by the layout tool 204, the simulation tool 206, and/or the verification tool 208 as described above inn FIG. 2. The electronic optimization platform 300 identifies one or more electronic architectural features, such as the geometric shapes, the locations of the geometric shapes, and/or the interconnections between the geometric shapes to provide some examples, from one or more electronic architectural designs corresponding to the one or more high-level software level descriptions. In some situations, the electronic optimization platform 300 can manipulate the one or more high-level software level descriptions over multiple iterations using a machine learning process until one or more electronic architectural models of the one or more high-level software level descriptions satisfy one or more electronic design targets. The electronic optimization platform 300 substitutes the one or more electronic architectural models that satisfy the one or more electronic design targets into the one or more high-level software level descriptions to optimize the one or more electronic architectural designs. In the exemplary embodiment illustrated in FIG. 3, the electronic optimization platform 300 includes a feature extraction tool 302, a data processing tool 304, a model substitution tool 306, a model development tool 310, and a model management tool 314. The electronic optimization platform 300 can represent an exemplary embodiment of the electronic optimization platform 104 as described above in FIG. 1. In an exemplary embodiment, the one or more computing devices, processors, controllers, or other devices can be one or more customized integrated circuits, referred to one or more application-specific integrated circuits (ASICs), for executing one or more of the feature extraction tool 302, the data processing tool 304, the model substitution tool 306, the model development tool 310, and the model management tool 314. In some embodiments, the one or more ASICs can accelerate computation time of the feature extraction tool 302, the data processing tool 304, the model substitution tool 306, the model development tool 310, and/or the model management tool 314 when compared to integrated circuits intended for general-purpose uses.

The feature extraction tool 302 represents a design optimization software tool, which when executed by one or more computing devices, processors, controllers, or other devices that will be apparent to those skilled in the relevant art(s) without departing from the spirit and scope of the present disclosure, extracts one or more routing characteristics from a high-level software level description of the electronic device provided by the layout tool 204, the simulation tool 206, and/or the verification tool 208 to provide the one or more routing characteristics to the data processing tool 304. In an exemplary embodiment, the high-level software level description of the electronic device represents the geometric shapes, the locations of the geometric shapes, and/or the interconnections between the geometric shapes provided by the layout tool 204, the simulation tool 206, and/or the verification tool 208. In another exemplary embodiment, the high-level software level description can represent a textual representation, such as a netlist or a high-level software model of the one or more electronic architectural designs using a high-level software language, such as a graphical design tool, for example C, System C, C++, LabVIEW, and/or MATLAB, a general purpose system design language, such as like SysML, SMDL and/or SSDL, or any other suitable high-level software language or the high-level software format that will be apparent to those skilled in the relevant art(s) without departing from the spirit and scope of the present disclosure, or a high-level software format, such as Common Power Format (CPF), Unified Power Formant (UPF), or any other suitable high-level software format that will be apparent to those skilled in the relevant art(s) without departing from the spirit and scope of the present disclosure, or an image-based representation, such as a computer-aided design (CAD) model to provide an example, of the electronic device. In this exemplary embodiment, the feature extraction tool 302 extracts the one or more routing characteristics, such as a number of network nodes, or nets within the one or more high-level software level descriptions, a fan-in or a fan-out of the analog circuitry and/or the digital circuitry of the one or more high-level software level descriptions, or any other suitable characteristic, parameter, or attribute of the geometric shapes, the locations of the geometric shapes, and/or the interconnections between the geometric shapes that will be apparent to those skilled in the relevant art(s) without departing from the spirit and scope of the present disclosure, from the one or more high-level software level descriptions provided by the layout tool 204, the simulation tool 206, and/or the verification tool 208 as described above in FIG. 2.

The data processing tool 304 represents a design optimization software tool, which when executed by one or more computing devices, processors, controllers, or other devices that will be apparent to those skilled in the relevant art(s) without departing from the spirit and scope of the present disclosure, translates the one or more routing characteristics provided by the feature extraction tool 302 into one or more electronic architectural designs which are suitable to be manipulated by the model substitution tool 306. The one or more electronic architectural designs represent one or more images and/or one or more data-based representations of geometric shapes describing circuitry of the electronic device, locations of the geometric shapes, and/or interconnections between the geometric shapes. The one or more electronic architectural designs can represent one or more JPEG (Joint Photographic Experts Group) images, JPEG File Interchange Format (JIFF) images, Exchangeable image file (Exif) images, Tagged Image File Format (TIFF) images, Graphics Interchange Format (GIF) images, Windows bitmap (BMP) images, and/or Portable Network Graphic (PNG) images corresponding to the one or more routing characteristics and/or one or more Gerber data files, AutoCAD Drawing Exchange Format (DXF) data files, Portable Document Format (PDF) data files, Electronic Design Interchange Format (EDIF) data files, ODB++ data files, one or more Association Connecting Electronics Industries (IPC) data files, such as IPC-2511A, IPC-2511B, or IPC-2581 to provide some examples, one or more International Organization for Standardization (ISO) data files, such as ISO 10303-210 to provide an example, corresponding to the one or more routing characteristics provided by the feature extraction tool 302.

The model substitution tool 306 represents a design optimization software tool, which when executed by one or more computing devices, processors, controllers, or other devices that will be apparent to those skilled in the relevant art(s) without departing from the spirit and scope of the present disclosure, substitutes one or more electronic architectural models that satisfy one or more electronic design targets into the one or more electronic architectural designs provided by the data processing tool 304 to optimize the one or more high-level software level descriptions provided by the layout tool 204, the simulation tool 206, and/or the verification tool 208 as described above in FIG. 2. In a substitution mode of operation, as shown by a signal flow 318 in FIG. 3, the model substitution tool 306 analyzes geometric shapes, locations of the geometric shapes, and/or interconnections between the geometric shapes from the one or more electronic architectural designs provided by the data processing tool 304 to identify one or more electronic architectural features of the one or more electronic architectural designs. Next, the model substitution tool 306 queries the model management tool 314 and/or a machine-readable medium 308 for one or more electronic architectural models corresponding to the one or more electronic architectural features that satisfy one or more electronic design targets. Thereafter, the model substitution tool 306 substitutes geometric shapes, locations of the geometric shapes, and/or interconnections between the geometric shapes from the one or more electronic architectural models provided by the machine-readable medium 308 and/or the model management tool 314 for the one or more electronic architectural features of the one or more electronic architectural designs to optimize the one or more electronic architectural designs and sends the one or more optimized electronic architectural designs to the layout tool 204, the simulation tool 206, and/or the verification tool 208 as described above in FIG. 2. In some situations, the model substitution tool 306 can translate the one or more optimized electronic architectural designs to be suitable to be for use by the layout tool 204, the simulation tool 206, and/or the verification tool 208 as described above in FIG. 2. For example, the model substitution tool 306 can translate the one or more optimized electronic architectural designs from the exemplary image format and/or data formats as described above into the high-level software language or the high-level software format formats as described above in FIG. 2.

In some situations, the model substitution tool 306 can be communicatively coupled to a machine-readable medium 308. In these situations, the model substitution tool 306 can query the machine-readable medium 308 for the one or more electronic architectural models corresponding to the one or more electronic architectural features that satisfy the one or more electronic design targets. Otherwise, the model substitution tool 306 can query the model management tool 314 for the one or more electronic architectural models corresponding to the one or more electronic architectural features that satisfy the one or more electronic design targets when the one or more electronic architectural models corresponding to the one or more electronic architectural features that satisfy the one or more electronic design targets are not present in the machine-readable medium 308.

The model development tool 310 represents a design optimization software tool, which when executed by one or more computing devices, processors, controllers, or other devices that will be apparent to those skilled in the relevant art(s) without departing from the spirit and scope of the present disclosure, develops one or more electronic architectural models corresponding to one or more electronic architectural features. Specifically, in a model development mode of operation as shown by a signal flow 320 in FIG. 3, the model development tool 310 identifies the one or more electronic architectural features, such as geometric shapes, locations of the geometric shapes, and/or interconnections between the geometric shapes to provide some examples, from the one or more electronic architectural designs provided by the data processing tool 304. The model development tool 310 can manipulate the one or more electronic architectural features, for example, adjust the geometric shapes, adjust the locations of the geometric shapes, and/or adjust the interconnections between the geometric shapes over multiple iterations to develop one or more electronic architectural models for the one or more electronic architectural features. For example, the model development tool 310 can increase and/or decrease lengths, widths, and/or thicknesses of the geometric shapes, locations of the geometric shapes, and lengths, widths, and/or thicknesses of interconnections between the geometric shapes. In some situations, the one or more electronic architectural models for the one or more electronic architectural features can be pre-determined using other electronic architectural designs for other electronic devices that are stored in a machine-readable medium 312. In these situations, the model development tool 310 can query the machine-readable medium 308 for the one or more electronic architectural models for the one or more electronic architectural features.

In an exemplary embodiment, the model development tool 310 utilizes the machine learning process to manipulate the geometric shapes, the locations of the geometric shapes, and/or the interconnections between the geometric shapes to develop the one or more electronic architectural models for the one or more electronic architectural features. As part of this machine learning process, the model development tool 310 selects a first implementation for the geometric shapes, the locations of the geometric shapes, and/or the interconnections of the planar geometric to develop a first potential electronic architectural model from among the one or more electronic architectural models for the one or more electronic architectural features. Next, the model development tool 310 simulates the first potential electronic architectural model to identify its one or more characteristics, parameters, or attributes. Then, the model development tool 310 compares the one or more characteristics, parameters, or attributes of the first potential electronic architectural model to the one or more electronic design targets to determine an error between the one or more characteristics, parameters, or attributes of the first potential electronic architectural model and the one or more electronic design targets. Thereafter, the model development tool 310 manipulates the geometric shapes, the locations of the geometric shapes, and/or the interconnections between the geometric shapes of the first potential electronic architectural model to be a second implementation to develop a second potential electronic architectural model from among the one or more electronic architectural models for the one or more electronic architectural features. For example, the model development tool 310 can increase and/or decrease lengths, widths, and/or thicknesses of the geometric shapes, locations of the geometric shapes, and lengths, widths, and/or thicknesses of interconnections between the geometric shapes of the first potential electronic architectural model to provide the second potential electronic architectural model. The model development tool 310 simulates the second potential electronic architectural model, compares the one or more characteristics, parameters, or attributes of the second potential electronic architectural model to the one or more electronic design targets to determine the error, and manipulates the geometric shapes, the locations of the geometric shapes, and/or the interconnections between the geometric shapes of the second potential electronic architectural model to develop other potential electronic architectural models from among the one or more electronic architectural models for the one or more electronic architectural features. Then, the model development tool 310 simulates the geometric shapes, the locations of the geometric shapes, and/or the interconnections between the geometric shapes of the one or more electronic architectural models to identify one or more characteristics, parameters, or attributes of the one or more electronic architectural models. In an exemplary embodiment, the model development tool 310 can provide a static timing analysis (STA), a voltage drop analysis, also referred to an IREM analysis, a Clock Domain Crossing Verification (CDC check), a formal verification, also referred to as model checking, equivalence checking, or any other suitable analysis that will be apparent to those skilled in the relevant art(s) without departing from the spirit and scope of the present disclosure. In an exemplary embodiment, the model development tool 310 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the other suitable analysis. Thereafter, the model development tool 310 provides the one or more electronic architectural models for the one or more electronic architectural features and their corresponding one or more characteristics, parameters, or attributes to the model management tool 314 for storage. The model development tool 310 iteratively repeats the manipulating, simulating, and/or comparing until the error resulting from this iterative repetition converges indicating the one or more electronic design targets have been satisfied.

The model management tool 314 represents a design optimization software tool, which when executed by one or more computing devices, processors, controllers, or other devices that will be apparent to those skilled in the relevant art(s) without departing from the spirit and scope of the present disclosure, provides the one or more electronic architectural models corresponding to one or more electronic architectural features that satisfy one or more electronic design targets. During operation, the model management tool 314 receives the query for the one or more electronic architectural models corresponding to the one or more electronic architectural features that satisfy the one or more electronic design targets from the model substitution tool 306. Thereafter, the model management tool 314 searches the machine-readable medium 316 for the one or more electronic architectural models which correspond to the one or more electronic architectural features and compares their corresponding one or more characteristics, parameters, or attributes to the one or more electronic design targets. In an exemplary embodiment, the machine-readable medium 316 arranges the one or more electronic architectural models and/or their corresponding one or more characteristics, parameters, or attributes in a tabular form, such as a look-up table (LUT) to provide an example, which is indexed by the one or more electronic architectural features and/or the one or more characteristics, parameters, or attributes. In another exemplary embodiment, the model management tool 314 stores the one or more electronic architectural features and their corresponding one or more characteristics, parameters, or attributes provided by the model development tool 310 in the machine-readable medium 316. The model management tool 314 selects an electronic architectural model from among the one or more electronic architectural models whose one or more characteristics, parameters, or attributes satisfy the one or more electronic design targets as the one or more electronic architectural models. In some situations, the selected potential electronic architectural model can be identified by the model management tool 314 in the machine-readable medium 316 as satisfy the one or more electronic design targets such that model management tool 314 can simply provide, without searching, the selected potential electronic architectural model for any subsequent query for the one or more electronic architectural models, corresponding to the one or more electronic architectural features, that satisfy one or more electronic design targets to the model substitution tool 306.

In an exemplary embodiment, the machine-readable medium 308, the machine-readable medium 312, and/or the machine-readable medium 316 can be situated along with the electronic optimization platform 300 in a centralized location. In another exemplary embodiment, the machine-readable medium 308, the machine-readable medium 312, and/or the machine-readable medium 316 can be remotely situated from the electronic optimization platform 300. In these exemplary embodiments, a subscription based service and/or license can be provided to access the machine-readable medium 308, the machine-readable medium 312, and/or the machine-readable medium 316. For example, the subscription based service and/or license can be provided to access the one or more pre-determined potential electronic architectural models are stored in the machine-readable medium 312. As another example, the subscription based service and/or license can be provided to access the one or more electronic architectural models and/or their corresponding one or more characteristics, parameters, or attributes stored in the machine-readable medium 316.

Figure 4:
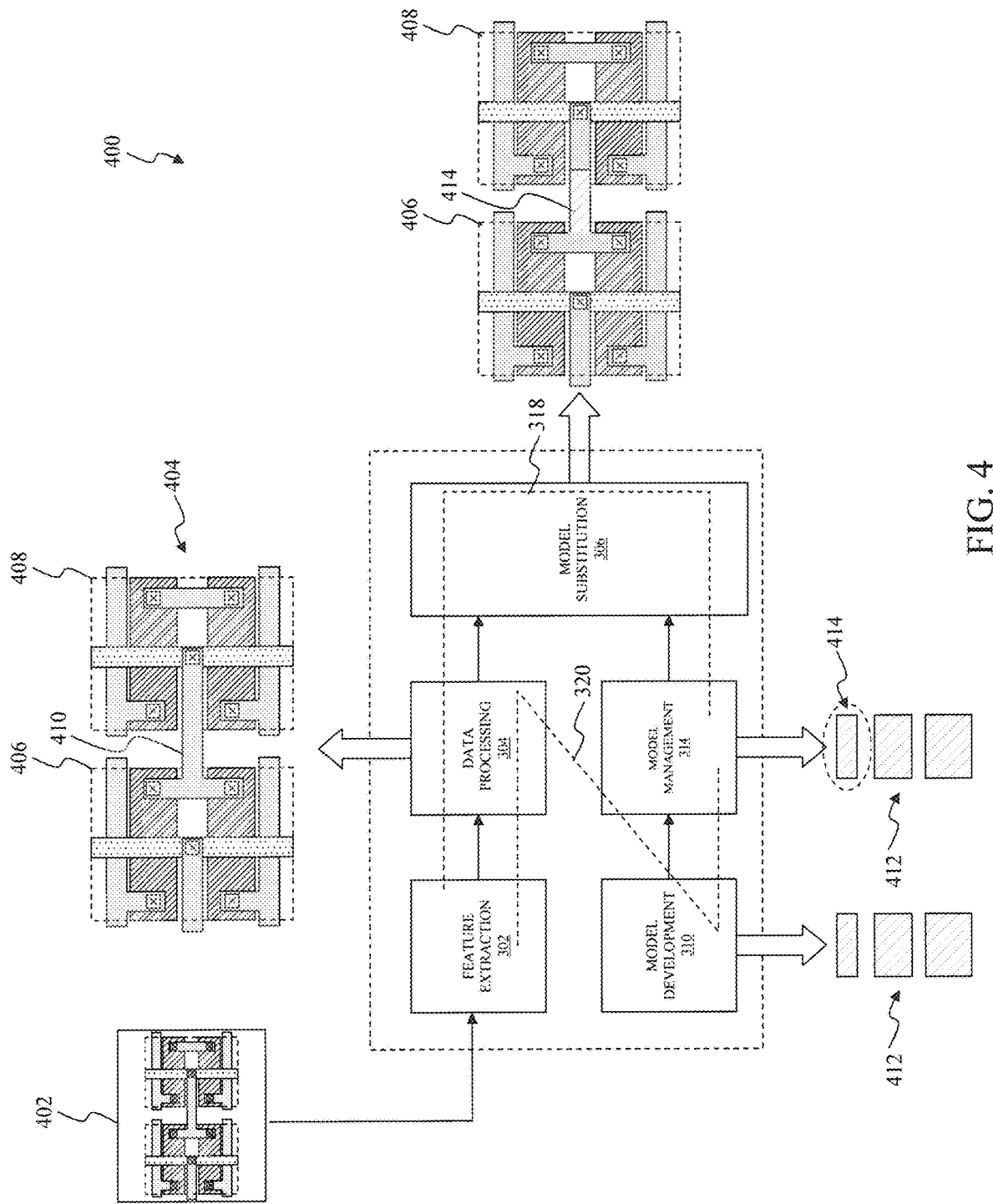
FIG. 4 illustrates a graphical illustration of an exemplary operation of the electronic optimization platform according to an exemplary embodiment of the present disclosure.

FIG. 4 illustrates a graphical illustration of an exemplary operation of the electronic optimization platform according to an exemplary embodiment of the present disclosure. As illustrated in FIG. 4, the electronic optimization platform 400 represents one or more machine learning software tools, that when executed by one or more computing devices, processors, controllers, or other devices that will be apparent to those skilled in the relevant art(s) without departing from the spirit and scope of the present disclosure, can optimize the designing, the simulating, the analyzing, and the verifying of a high-level software level description 402 of an electronic device. As described above, the feature extraction tool 302 extracts one or more routing characteristics from a high-level software level description 402 of the electronic device provided by the electronic design platform 102 to provide one or more routing characteristics to the data processing tool 304. In an exemplary embodiment, the high-level software level description 402 represents a textual or an image-based representation of the geometric shapes, the locations of the geometric shapes, and/or the interconnections between the geometric shapes for the electronic device. The data processing tool 304 translates the one or more routing characteristics into electronic architectural design 404 which are suitable to be manipulated by the model substitution tool 306. As illustrated in FIG. 4, the data processing tool 304 can translate the one or more routing characteristics of the high-level software level description 402 into an electronic architectural design 404 using one or more standard cells from a predefined library of standard cells representing the geometric shapes, the locations of the geometric shapes, and/or the interconnections between the geometric shapes corresponding to the high-level software level description 402. In the exemplary embodiment illustrated in FIG. 4, the electronic architectural design 404 includes a first standard cell 406 and a second standard cell 408 from the predefined library of standard cells and an interconnection 410 between the first standard cell 406 and the second standard cell 408.

The model substitution tool 306 manipulates the electronic architectural design 404 provided by the data processing tool 304 to optimize the designing, the simulating, the analyzing, and the verifying of the high-level software level description 402 of the electronic device provided by the electronic design platform 102. In the substitution mode of operation, shown by the signal flow 318 in FIG. 3, the model substitution tool 306 analyzes geometric shapes, locations of the geometric shapes, and/or interconnections between the geometric shapes from the electronic architectural design 404 to identify the interconnection 410 from the electronic architectural design 404. Next, the model substitution tool 306 queries the model management tool 314 for electronic architectural models 412 that have a minimum voltage drop. Thereafter, the model substitution tool 306 substitutes the interconnection 414 for the interconnection 410 in the electronic architectural design 404 to optimize the electronic architectural design 404 and sends the optimized electronic architectural design to the electronic optimization platform 104.

The model development tool 310 develops electronic architectural models 412 corresponding to interconnection 410. Specifically, in the model development mode of operation shown by a signal flow 320 in FIG. 3, the model development tool 310 analyzes the geometric shapes, the locations of the geometric shapes, and/or the interconnections between the geometric shapes of the electronic architectural design 404 to identify the interconnection 410 from the electronic architectural design 404. Next, the model development tool 310 develops, using the machine learning process, the interconnection 410 to develop the electronic architectural models 412. Then, the model development tool 310 simulates the electronic architectural models 412 to identify voltage drops for the electronic architectural models 412. Thereafter, the model development tool 310 provides the electronic architectural models 412 and their corresponding voltage drops to the model management tool 314 for storage.

The model management tool 314 receives a query for the electronic architectural models 412 that have a minimum voltage drop. Thereafter, the model management tool 314 searches for the electronic architectural models 412 which correspond to the interconnection 410 and compares their corresponding voltage drops to determine which is the minimum voltage drop. The model management tool 314 selects the interconnection 414 from among the electronic architectural models 412 whose voltage drop is the minimum voltage drop. Once the interconnection 412 corresponding to the minimum voltage drop has been selected by the model management tool 314, the model management tool 314 can simply provide the interconnection 412 which corresponds to the minimum voltage drop for all future queries for the interconnection 410 having a minimum voltage drop.

Exemplary Computer System for Implementing the Exemplary Design Environment

Figure 5:
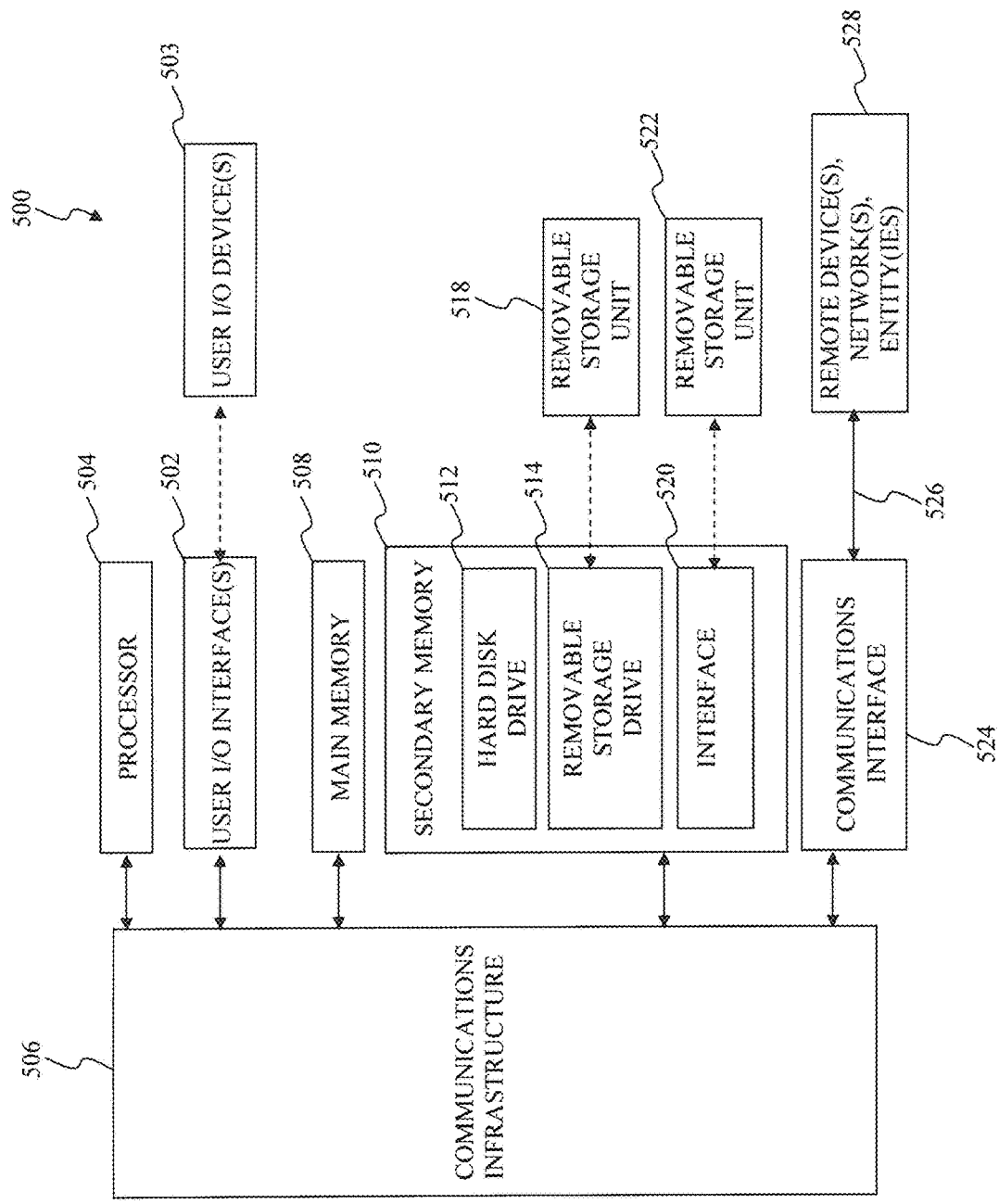
FIG. 5 illustrates a block diagram of an exemplary computer system for implementing the exemplary design environment according to an exemplary embodiment of the present disclosure.

FIG. 5 illustrates a block diagram of an exemplary computer system for implementing the exemplary design environment according to an exemplary embodiment of the present disclosure. A computer system 500 can be used to implement the exemplary design environment 100, the electronic design platform 200, and/or the electronic optimization platform 300. However, in some situations, more than one computer system 500 can be used to implement the exemplary design environment 100, the electronic design platform 200, and/or the electronic optimization platform 300. After reading this description, it will become apparent to a person skilled in the relevant art how to implement embodiments using other computer systems and/or computer architectures.

The computer system 500 includes one or more processors 504, also referred to as central processing units, or CPUs, to execute the synthesis tool 202, the layout tool 204, the simulation tool 206, and/or the verification tool 208 as described above in FIG. 2 and/or the feature extraction tool 302, the data processing tool 304, the model substitution tool 306, the model development tool 310, and the model management tool 314 as described above in FIG. 3 and FIG. 4. The one or more processors 504 can be connected to a communication infrastructure or bus 506. In an exemplary embodiment, one or more of the one or more processors 504 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 500 also includes user input/output device(s) 503, such as monitors, keyboards, pointing devices, etc., which communicate with communication infrastructure 506 through user input/output interface(s) 502.

The computer system 500 also includes a main or primary memory 508, such as a random-access memory (RAM) to provide an example. The main memory 508 can include one or more levels of cache. The main memory 508 has stored therein control logic (i.e., computer software) and/or data, such as the synthesis tool 202, the layout tool 204, the simulation tool 206, and/or the verification tool 208 as described above in FIG. 2 and/or the feature extraction tool 302, the data processing tool 304, the model substitution tool 306, the model development tool 310, and the model management tool 314 as described above in FIG. 3 and FIG. 4.

The computer system 500 can also include one or more secondary storage devices or memory 510 to store the synthesis tool 202, the layout tool 204, the simulation tool 206, and/or the verification tool 208 as described above in FIG. 2 and/or the feature extraction tool 302, the data processing tool 304, the model substitution tool 306, the model development tool 310, and the model management tool 314 as described above in FIG. 3 and FIG. 4 to provide some examples. The one or more secondary storage devices or memory 510 can include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive. The removable storage drive 514 may interact with a removable storage unit 518. The removable storage unit 518 includes a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 reads from and/or writes to removable storage unit 518 in a well-known manner.

According to an exemplary embodiment, the one or more secondary storage devices or memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication or network interface 524 enables the computer system 500 to communicate and interact with any combination of remote devices, remote networks, remote entities, etc. (individually and collectively referenced by reference number 528). For example, the communication or network interface 524 may allow the computer system 500 to communicate with the remote devices 528 over a communications path 526, which may be wired and/or wireless, and which may include any combination of LANs, WANs, the Internet, etc. Control logic and/or data may be transmitted to and from the computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, that when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

Figure 6:
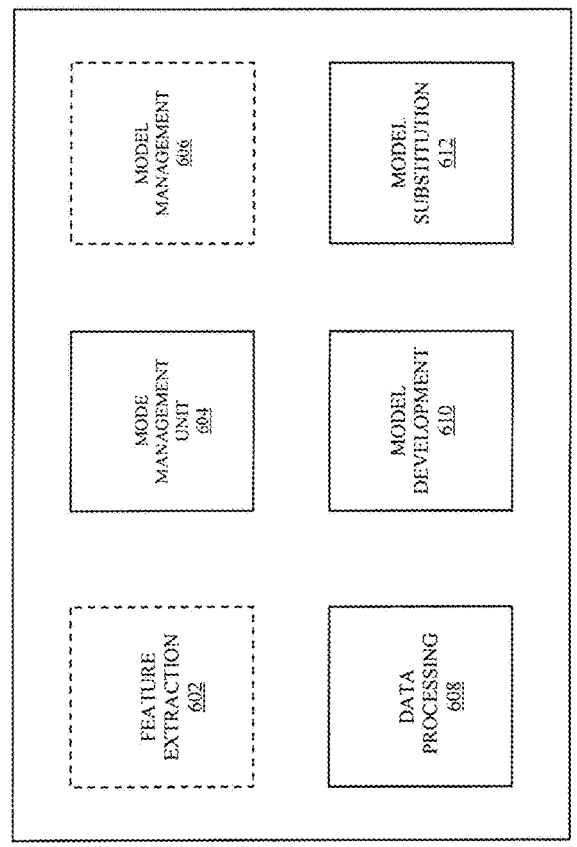
FIG. 6 illustrates a block diagram of an exemplary processor of the exemplary computer system according to an exemplary embodiment of the present disclosure.

FIG. 6 illustrates a block diagram of an exemplary processor of the exemplary computer system according to an exemplary embodiment of the present disclosure. As discussed above, an electronic optimization platform, such as the electronic optimization platform 104 to provide an example, when executed by a processor 600, can optimize the designing, the simulating, the analyzing, and the verifying of the electronic device performed by the electronic design platform 102. The processor 600 can represent an exemplary embodiment of the one or more processors 504.

As illustrated in FIG. 6, the processor 600 can include any combination of hardware, firmware, and/or software to execute the electronic optimization platform. For example, a feature extraction 602, such as the feature extraction tool 302 to provide an example, and a model management tool 606, such as the model management tool 314 to provide an example, can be implemented in software, shown using "dashed" boxes in FIG. 6, executing on the processor 600. In this example, a mode management tool 604 to control operation of the processor 600, a data processing tool 608, such as the data processing tool 304 to provide an example, a model development tool 610, such as the model development tool 310 to provide an example, and a model substitution tool 612, such as the model substitution tool 306 to provide an example, can be implemented in hardware and/or firmware, shown using "solid" boxes in FIG. 6. In an exemplary embodiment, the hardware can represent one or more application-specific integrated circuits (ASICs) within the processor 600 and/or firmware executed by the processor 600 for execution of the mode management tool 604, the data processing tool 608, the model development tool 610, and/or the model substitution tool 612. The one or more ASICs and/or the firmware can accelerate computation time of the mode management tool 604, the data processing tool 608, the model development tool 610, and the model substitution tool 612 when compared to integrated circuits intended for general-purpose uses. Additionally, the one or more ASICs and/or the firmware provide beneficial configurability for the processor 600. In an exemplary embodiment, a subscription based service and/or license can be used to provide different ASICs and/or firmware. For example, different machine learning packages can be offered by the provider of the subscription based service and/or license, such as a detour machine learning package, a voltage drop machine learning package, a congestion machine learning package, and/or a clock latency machine learning package. In this example, a subscriber of the subscription based service and/or license can purchase the subscription based service and/or license corresponding to a desired machine learning package and can install the one or more ASICs and/or the firmware corresponding to this desired machine learning package into the processor 600 to configure the mode management tool 604, the data processing tool 608, the model development tool 610, and the model substitution tool 612 to operate in accordance with the desired machine learning package. For example, the detour machine learning package, the voltage drop machine learning package, the congestion machine learning package, and/or the clock latency machine learning package can pre-store corresponding electronic architectural models that satisfy the one or more electronic design targets in the machine-readable medium 308, corresponding pre-determined potential electronic architectural models in the machine-readable medium 312, and/or corresponding potential electronic architectural models and their corresponding one or more characteristics, parameters, or attributes in the machine-readable medium 316.

Exemplary Operation of the Electronic Optimization Platform

Figure 7:
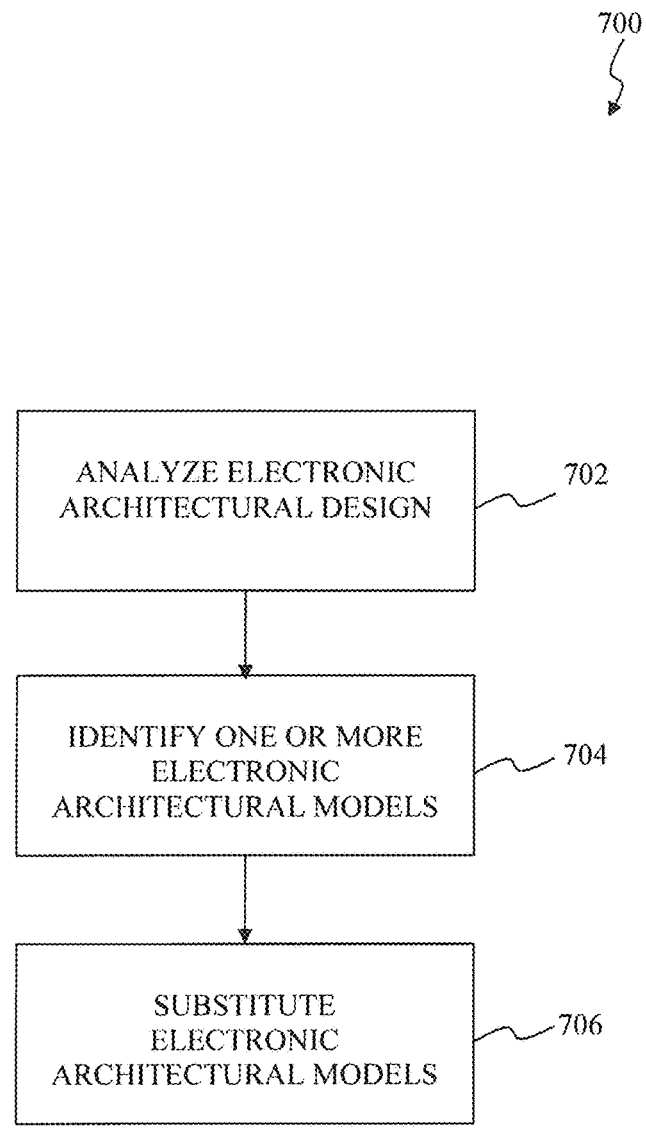
FIG. 7 illustrates a flowchart of a first exemplary operation of the electronic optimization platform algorithm according to an exemplary embodiment of the present disclosure.

FIG. 7 illustrates a flowchart of a first exemplary operation of the electronic optimization platform algorithm according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 700 to optimize the designing, the simulating, the analyzing, and the verifying of an electronic device. The operational control flow 700 can represent an exemplary operation for the electronic optimization platform 300 in the substitution mode of operation as described above in FIG. 3.

At operation 702, the operational control flow 700 analyzes geometric shapes which correspond to diffusion layers, polysilicon layers, metal layers, and/or interconnections between layers of an electronic architectural design, locations of the geometric shapes, and/or interconnections between the geometric shapes to identify one or more electronic architectural features of the one or more electronic architectural designs. This operation can be performed by one or more computing devices, processors, controllers, or other devices that will be apparent to those skilled in the relevant art(s) without departing from the spirit and scope of the present disclosure, such as the computer system 500 to providing an example, executing one or more software tools, such as the model substitution tool 306 to provide an example.

At operation 704, the operational control flow 700 identifies one or more electronic architectural models which correspond to the one or more electronic architectural features that satisfy one or more design targets. The operational control flow 700 can search one or more machine-readable mediums, such as the machine-readable medium 308, the machine-readable medium 312, and/or the machine-readable medium 316 to provide some examples, to identify one or more electronic architectural models. This operation can be performed by one or more computing devices, processors, controllers, or other devices that will be apparent to those skilled in the relevant art(s) without departing from the spirit and scope of the present disclosure, such as the computer system 500 to providing an example, executing one or more software tools, such as the model substitution tool 306 and/or the model management tool 314 to provide some examples.

At operation 706, the operational control flow 700 substitutes the one or more electronic architectural models that satisfy the one or more electronic design targets for the one or more electronic architectural features in the one or more electronic architectural designs to optimize the one or more electronic architectural designs. This operation can be performed by one or more computing devices, processors, controllers, or other devices that will be apparent to those skilled in the relevant art(s) without departing from the spirit and scope of the present disclosure, such as the computer system 500 to providing an example, executing one or more software tools, such as the model substitution tool 306 to provide an example.

Figure 8:
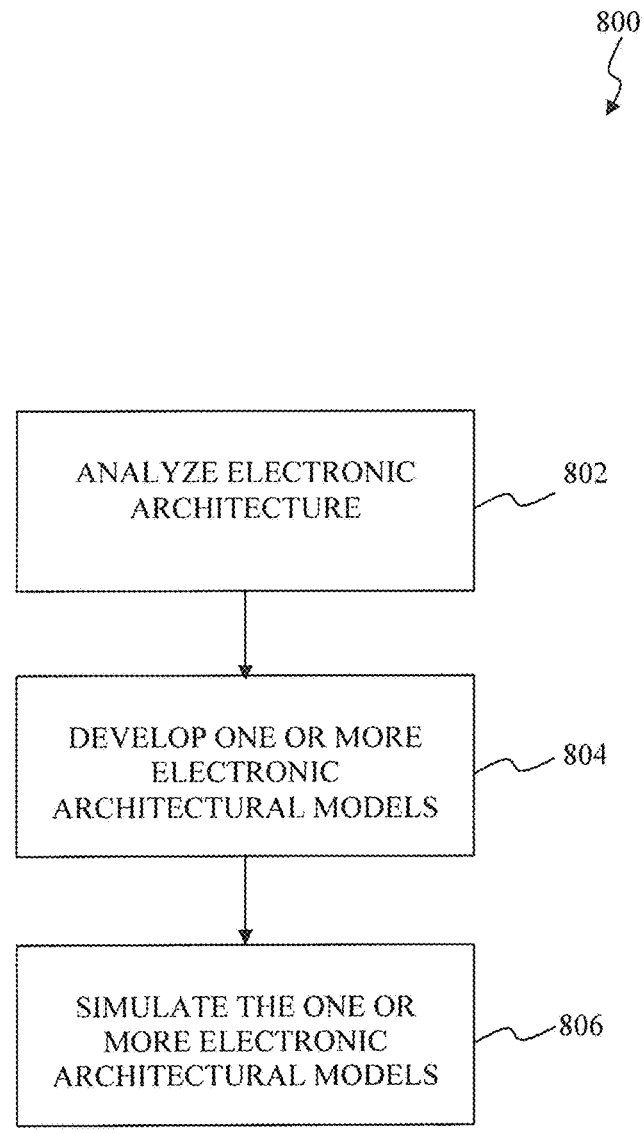
FIG. 8 illustrates a flowchart of a second exemplary operation of the electronic optimization platform algorithm according to an exemplary embodiment of the present disclosure.

FIG. 8 illustrates a flowchart of a second exemplary operation of the electronic optimization platform algorithm according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 800 to optimize the designing, the simulating, the analyzing, and the verifying of an electronic device. The operational control flow 800 can represent an exemplary operation for the electronic optimization platform 300 in the model development mode of operation as described above in FIG. 3.

At operation 802, the operational control flow 800 analyzes geometric shapes which correspond to diffusion layers, polysilicon layers, metal layers, and/or interconnections between layers of an electronic architectural design, locations of the geometric shapes, and/or interconnections between the geometric shapes to identify one or more electronic architectural features of the one or more electronic architectural designs. This operation can be performed by one or more computing devices, processors, controllers, or other devices that will be apparent to those skilled in the relevant art(s) without departing from the spirit and scope of the present disclosure, such as the computer system 500 to providing an example, executing one or more software tools, such as the model development tool 310 to provide an example.

At operation 804, the operational control flow 800 utilizes the machine learning process to develops one or more electronic architectural models corresponding to one or more electronic architectural features. The operational control flow 800 develops, using the machine learning process, the geometric shapes, the locations of the geometric shapes, and/or the interconnections between the geometric shapes of the one or more electronic architectural models. This operation can be performed by one or more computing devices, processors, controllers, or other devices that will be apparent to those skilled in the relevant art(s) without departing from the spirit and scope of the present disclosure, such as the computer system 500 to providing an example, executing one or more software tools, such as the model development tool 310 to provide an example.

At operation 804, the operational control flow 800 simulates the geometric shapes, the locations of the geometric shapes, and/or the interconnections between the geometric shapes of the one or more electronic architectural models to identify one or more characteristics, parameters, or attributes of the one or more electronic architectural models. In an exemplary embodiment, the operational control flow 800 can provide a static timing analysis (STA), a voltage drop analysis, also referred to an IREM analysis, a Clock Domain Crossing Verification (CDC check), a formal verification, also referred to as model checking, equivalence checking, or any other suitable analysis that will be apparent to those skilled in the relevant art(s) without departing from the spirit and scope of the present disclosure. In an exemplary embodiment, the operational control flow 800 can perform an alternating current (AC) analysis, such as a linear small-signal frequency domain analysis, and/or a direct current (DC) analysis, such as a nonlinear quiescent point calculation or a sequence of nonlinear operating points calculated while sweeping a voltage, a current, and/or a parameter to perform the STA, the IREM analysis, or the other suitable analysis. This operation can be performed by one or more computing devices, processors, controllers, or other devices that will be apparent to those skilled in the relevant art(s) without departing from the spirit and scope of the present disclosure, such as the computer system 500 to providing an example, executing one or more software tools, such as the model development tool 310 to provide an example.

CONCLUSION

The foregoing Detailed Description discloses a method for developing an electronic architectural design for an electronic device. The method includes identifying, by a computer system, an electronic architectural feature from the electronic architectural design, developing an architectural model corresponding to the electronic architectural feature that satisfies an electronic design target, and substituting the architectural model corresponding to the electronic architectural feature that satisfies the electronic design target in the electronic architectural design.

The foregoing Detailed Description additionally discloses a computer system for optimizing an electronic architectural design for an electronic device. The computer system includes a memory and a processor. The memory stores one or more instructions. The processor executes the one or more instructions, the one or more instructions, when executed by the processor, configuring the processor to: iteratively manipulate an electronic architectural feature of the electronic architectural design to develop multiple architectural models until an architectural model from among the multiple architectural models satisfies an electronic design target for the electronic architectural feature, and substitute the electronic architectural model that satisfies the electronic design target for the electronic architectural feature in the electronic architectural design to optimize the electronic architectural design.

The foregoing Detailed Description further discloses a non-transitory machine-readable medium having instructions stored thereon. The instructions, when executed by a computer system, causes the computer system to perform operations including: identifying an electronic architectural feature of the electronic architectural design; developing multiple electronic architectural models corresponding to the electronic architectural feature of the electronic architectural design; simulating the multiple electronic architectural models to provide multiple characteristics, parameters, or attributes; searching the multiple electronic architectural models for an electronic architectural model from among multiple electronic architectural models whose characteristic, parameter, or attribute from among the multiple characteristics, parameters, or attributes satisfies an electronic design target for the electronic architectural feature, and substituting the electronic architectural model that satisfies the electronic design target for the electronic architectural feature in the electronic architectural design to optimize the electronic architectural design.

The foregoing Detailed Description outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for developing an electronic architectural design for an electronic device, the method comprising:
   identifying, by a computer system, an electronic architectural feature from the electronic architectural design, the electronic architectural design including geometric shapes describing circuitry of the electronic device which correspond to diffusion layers, polysilicon layers, metal layers and interconnections between the diffusion layers, the polysilicon layers, and/or the metal layers, locations of the geometric shapes, and interconnections between the geometric shapes;
   developing an electronic architectural model having the electronic architectural feature that satisfies an electronic design target; and
   substituting the electronic architectural model into the electronic architectural design,
   wherein at least one of the identifying, developing, or substituting is performed by a computer.

2. The method of claim 1, wherein the electronic architectural design comprises an image or a data-based representation of the geometric shapes describing the circuitry of the electronic device, the location of the geometric shapes, and the interconnections between the geometric shapes.

3. The method of claim 1, wherein the electronic architectural feature comprises at least one of:
   a geometric shape from the electronic architectural design;
   a location of the geometric shape; or
   interconnections of the geometric shape.

4. The method of claim 1, wherein the developing comprises:
   using a machine learning process to manipulate the electronic architectural feature over a plurality of iterations to develop a plurality of electronic architectural models, the plurality of electronic architectural models including the electronic architectural model.

5. The method of claim 4, wherein the machine learning process comprises:
   adjusting a length, a width, and/or a thickness of the electronic architectural feature, a location of the electronic architectural feature, or a length, a width, and/or a thickness of an interconnection of the electronic architectural feature to develop the electronic architectural model;
   simulating the electronic architectural model to identify a characteristic, a parameter, or an attribute of the electronic architectural model;
   comparing the characteristic, the parameter, or the attribute to the electronic design target for the electronic architectural feature to generate an error from among a plurality of errors between the characteristic, the parameter, or the attribute and the electronic design target for the electronic architectural feature, and
   iteratively repeating the adjusting, the simulating, and the comparing.

6. The method of claim 1, wherein the identifying comprises:
   identifying the electronic architectural feature from the electronic architectural design in terms of a geometric shape, the location of the geometric shape, and/or the interconnections of the geometric shape, and
   wherein the developing comprises:
   manipulating the geometric shape, the location of the geometric shape, and/or the interconnections of the geometric shape over a plurality of iterations to develop the electronic architectural model.

7. The method of claim 6, wherein the manipulating the geometric shape comprises:
adjusting a length, a width, and/or a thickness of the geometric shape, a location of the geometric shape, or a length, a width, and/or a thickness of an interconnection of the geometric shape.

8. The method of claim 1, further comprising:
translating, by the computer system, a software level description of the electronic device to provide the electronic architectural design.

9. A computer system for optimizing an electronic architectural design for an electronic device, the computer system comprising:
a memory that stores one or more instructions; and
a processor, in communication with the memory, configured to execute the one or more instructions, the one or more instructions, when executed by the processor, configuring the processor to:
iteratively manipulate an electronic architectural feature of the electronic architectural design to develop a plurality of electronic architectural models until an electronic architectural model from among the plurality of electronic architectural models satisfies an electronic design target for the electronic architectural feature, and the electronic architectural design including geometric shapes describing circuitry of the electronic device which correspond to diffusion layers, polysilicon layers, metal layers and interconnections between the diffusion layers, the polysilicon layers, and/or the metal layers, locations of the geometric shapes, and interconnections between the geometric shapes, and
substitute the electronic architectural model that satisfies the electronic design target for the electronic architectural feature in the electronic architectural design to optimize the electronic architectural design.

10. The computer system of claim 9, wherein the electronic architectural design comprises an image or a data-based representation of the geometric shapes describing the circuitry of the electronic device, the location of the geometric shapes, and the interconnections between the geometric shapes.

11. The computer system of claim 9, wherein the electronic architectural feature comprises at least one of:
a geometric shape from the electronic architectural design;
a location of the geometric shape; or
interconnections of the geometric shape.

12. The computer system of claim 9, wherein the one or more instructions, when executed by the processor, configure the processor to:
iteratively manipulate the electronic architectural feature of the electronic architectural design to develop the plurality of electronic architectural models using a machine learning process.

13. The computer system of claim 12, wherein the machine learning process is configured to:
adjust a length, a width, and/or a thickness of the electronic architectural feature, a location of the electronic architectural feature, or a length, a width, and/or a thickness of an interconnection of the electronic architectural feature to develop the electronic architectural model;
simulate the electronic architectural model to identify a characteristic, a parameter, or an attribute of the electronic architectural model;
compare the characteristic, the parameter, or the attribute to the electronic design target for the electronic architectural feature to generate an error from among a plurality of errors between the characteristic, the parameter, or the attribute and the electronic design target for the electronic architectural feature, and
iteratively adjust, simulate, and compare until the plurality of errors converge.

14. The computer system of claim 9, wherein the one or more instructions, when executed by the processor, further configure the processor to:
identify the electronic architectural feature from the electronic architectural design in terms of a geometric shape, the location of the geometric shape, and/or the interconnections of the geometric shape, and
iteratively manipulate the geometric shape, the location of the geometric shape, and/or the interconnections of the geometric shape to develop the plurality of electronic architectural models.

15. The computer system of claim 14, wherein the one or more instructions, when executed by the processor, configure the processor to:
iteratively adjust a length, a width, and/or a thickness of the geometric shape, a location of the geometric shape, or a length, a width, and/or a thickness of an interconnection of the geometric shape to develop the plurality of electronic architectural models.

16. The computer system of claim 9, wherein the one or more instructions, when executed by the processor, configure the processor to:
translate a software level description of the electronic device to provide the electronic architectural design.

17. A non-transitory machine-readable medium having instructions stored thereon that, when executed by a computer system, causes the computer system to perform operations comprising:
identifying an electronic architectural feature of the electronic architectural design, the electronic architectural design including geometric shapes describing circuitry of the electronic device which correspond to diffusion layers, polysilicon layers, metal layers and interconnections between the diffusion layers, the polysilicon layers, and/or the metal layers, locations of the geometric shapes, and interconnections between the geometric shapes;
developing a plurality of electronic architectural models corresponding to the electronic architectural feature of the electronic architectural design;
simulating the plurality of electronic architectural models to provide a plurality of characteristics, parameters, or attributes;
searching the plurality of electronic architectural models for an electronic architectural model from among plurality of electronic architectural models whose characteristic, parameter, or attribute from among the plurality of characteristics, parameters, or attributes satisfies an electronic design target for the electronic architectural feature, and
substituting the electronic architectural model that satisfies the electronic design target for the electronic architectural feature in the electronic architectural design to optimize the electronic architectural design.

18. The non-transitory machine-readable medium of claim 17, wherein the developing comprises:

developing a plurality of electronic architectural models corresponding to the electronic architectural feature of the electronic architectural design using a machine learning process; and wherein the simulating comprises:
simulating the plurality of electronic architectural models during the machine learning process.

19. The non-transitory machine-readable medium of claim 18, wherein the machine learning process further comprises:

comparing the plurality of characteristics, parameters, or attributes to the electronic design target for the electronic architectural feature to generate a plurality of errors between the plurality of characteristics, parameters, or attribute and the electronic design target for the electronic architectural feature, wherein the plurality of electronic architectural models are iteratively developed, simulated, and compared until the plurality of errors converge.

20. The non-transitory machine-readable medium of claim 18, wherein the developing comprises:

adjusting a length, a width, and/or a thickness of the electronic architectural feature, a location of the electronic architectural feature, or a length, a width, and/or a thickness of an interconnection of the electronic architectural feature to develop the plurality of electronic architectural models.

* * * * *